J. C. OWENS.
TOOL.
APPLICATION FILED JUNE 7, 1911.
1,012,148.
Patented Dec. 19, 1911.
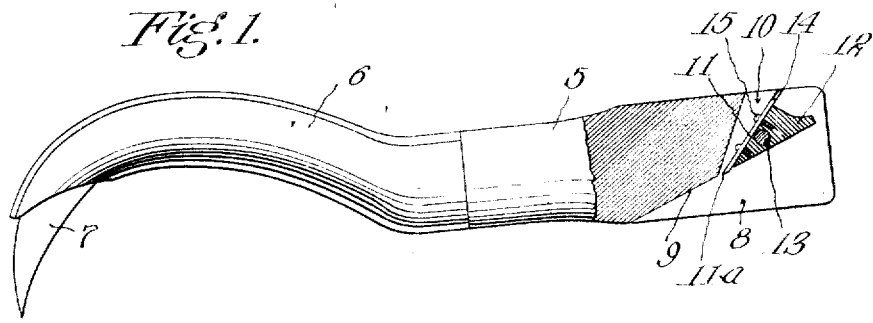
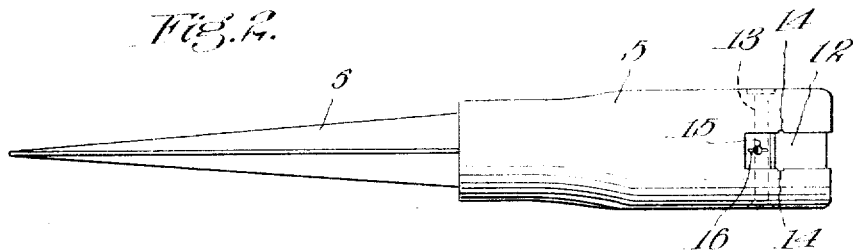
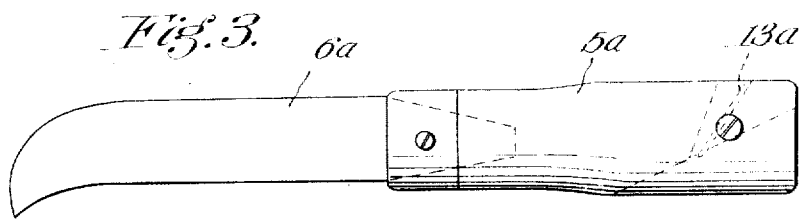
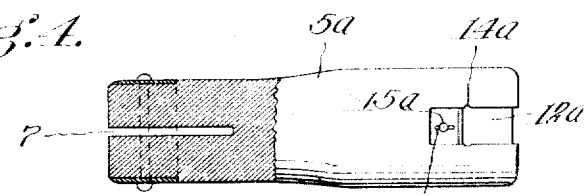
Witnesses
Inventor
Jasper C. Owens
by James T. Barkelew
his Attorney.

UNITED STATES PATENT OFFICE.

JASPER C. OWENS, OF LOS ANGELES, CALIFORNIA.

TOOL.

1,012,148.  Specification of Letters Patent.  Patented Dec. 19, 1911.

Application filed June 7, 1911. Serial No. 631,710.

*To all whom it may concern:*

Be it known that I, JASPER C. OWENS, a citizen of the United States, residing at Los Angeles, in the county of Los Angeles, State of California, have invented new and useful Improvements in Tools, of which the following is a specification.

This invention relates to a tool for planing the edge of cut linoleum or other like substance; and the invention consists mainly in the provision of such a tool in convenient form for use by workmen laying linoleum and in such form that it may be combined with another tool, such as a linoleum knife.

In the drawings I have shown my present invention in combination with a linoleum knife and on a handle to which any kind of tool may be applied. Although I contemplate the most efficient form to be in connection with a knife for use in cutting linoleum, I may also mount my new tool on its own handle and use it without connection with any other tool; or I may find it more convenient to use the handle for the mounting of a screw driver or some other tool of general use.

In the accompanying drawings: Figure 1 is an elevation, partly in section, of my improved tool shown in combination with a linoleum knife of my own design. Fig. 2 is a plan of the same. Fig. 3 is a side elevation of a modified form. Fig. 4 is a plan showing a modified form of handle adaptable to any tool.

In the drawings 5 designates a handle of suitable size and configuration and shown as adapted to carry a sheath 6 in which movable and adjustable blade 7 is mounted (Figs. 1 and 2). In Fig. 3 I have shown handle 5ª as provided with a knife blade 6ª of the ordinary style, and in Fig. 4 I have shown the handle 5ª equipped with a slot 7 adapted to receive a knife or any other tool. By these showings I illustrate that the handle may be arranged to hold any sort of knife or other tool, and especially a tool of convenience to a workman laying linoleum.

At the end of the handle 5 a slot 8 is cut which has a bottom 9 diagonal to the length of the handle. Beyond the bottom 9 of the slot a recess 10 is cut through the handle and in this recess a planer knife 11 is mounted. Planer knife 11 is mounted on a small block 12, the block being held tightly between the side walls of recess 10 and clamped in place by means of a bolt 13 passing through the handle. Knife 11 is placed with its edges in slots 14 so as to be held from rotation about bolt 13. Small screws 15 passing through slots 16 in knife 11 allow the longitudinal adjustment of the knife on block 12 and in slots 14, so that its cutting edge 11ª may be projected beyond the bottom 9 of slot 8 as much as desired.

For trimming and smoothing the edges of linoleum the handle 5 is grasped at its forward end and the slot 8 placed over the edge of the linoleum, the tool being then drawn toward the user. Knife 11 acts as a plane on the edge of the linoleum, smoothing and straightening the edge and producing a neat finish. The handle is in a convenient position to be grasped by the user, projecting forwardly and upwardly diagonally when bottom 9 of slot 8 is laid flatly on the edge of the linoleum held horizontally.

For establishments where there is a large amount of linoleum cutting and finishing to be done the form of tool in which a separate handle is used may be more convenient; but for use outside such an establishment, where, for instance, the workman lays a small piece of linoleum in a distant dwelling, it may be far more convenient to have his linoleum knife and plane mounted on the same handle. This I have consequently shown as the preferred form but without limiting myself to such a combination.

Having described my invention, I claim:

A device of the class described, comprising a handle, a slot cut longitudinally of the handle at the rear end on its under side and having its upper wall diagonal to the length of the handle, a recess cut in the handle above the top of the slot, the side walls of the recess having opposite grooves cut therein, a planer block mounted in the recess, a planer knife mounted in the grooves in the recess walls and having its cutting edge projecting beyond the top of the slot, and means for holding the planer block and planer knife in position in the recess, the planer knife pointing forwardly and downwardly so as to act when the handle is pulled forwardly.

In witness that I claim the foregoing I have hereunto subscribed my name this 1st day of June 1911.

JASPER C. OWENS.

Witnesses:
 JAMES T. BARKELEW,
 JAS. H. BALLAGH.